(12) United States Patent
Schaefer et al.

(10) Patent No.: US 11,994,841 B2
(45) Date of Patent: May 28, 2024

(54) SYSTEM AND METHOD FOR CONTROLLING A CORE DRILL AND AN AUTO FEED DEVICE WITH A HUMAN MACHINE INTERFACE ARRANGED ON THE CORE DRILL

(71) Applicant: Hilti Aktiengesellschaft, Schaan (LI)

(72) Inventors: Martin Schaefer, Schwarzach (AT); Marco Balter, Feldkirch (AT); Christian Metzler, Satteins (AT)

(73) Assignee: Hilti Aktiengesellschaft, Schaan (LI)

( * ) Notice: Subject to any disclaimer, the term of this patent is extended or adjusted under 35 U.S.C. 154(b) by 213 days.

(21) Appl. No.: 17/621,933

(22) PCT Filed: Jun. 19, 2020

(86) PCT No.: PCT/EP2020/067176
§ 371 (c)(1),
(2) Date: Dec. 22, 2021

(87) PCT Pub. No.: WO2020/260156
PCT Pub. Date: Dec. 30, 2020

(65) Prior Publication Data
US 2022/0276638 A1    Sep. 1, 2022

(30) Foreign Application Priority Data

Jun. 27, 2019 (EP) ..................................... 19182858

(51) Int. Cl.
*G05B 19/416* (2006.01)

(52) U.S. Cl.
CPC .................. *G05B 19/4166* (2013.01); *G05B 2219/41109* (2013.01)

(58) Field of Classification Search
USPC ........................................................... 700/28
See application file for complete search history.

(56) References Cited

U.S. PATENT DOCUMENTS

| 4,854,786 A * | 8/1989 | Alexander ......... G05B 19/4163 409/187 |
| 2004/0253064 A1* | 12/2004 | Koslowski ............. B28D 1/041 408/1 R |

(Continued)

FOREIGN PATENT DOCUMENTS

| DE | 10 2011 082 988 A1 | 3/2013 |
| DE | 10 2016 010 068 A1 | 3/2017 |

(Continued)

OTHER PUBLICATIONS

PCT/EP2020/067176, International Search Report dated Aug. 26, 2020 (Two (2) pages).

*Primary Examiner* — Hien D Khuu
(74) *Attorney, Agent, or Firm* — Crowell & Moring LLP

(57) ABSTRACT

A system includes a core drill and an automatic feed device. The core drill has a human machine interface (HMI) for controlling the core drill and the automatic feed device. A menu navigation of the HMI is automatically controllable in dependence on an operating state of the core drill or the automatic feed device. The menu navigation includes menu pages where the menu pages are displayable in dependence on the operating state of the core drill or the automatic feed device such that the menu navigation is controllable automatically depending on the operating state of the core drill or the automatic feed device.

6 Claims, 1 Drawing Sheet

(56) References Cited

U.S. PATENT DOCUMENTS

| | | | |
|---|---|---|---|
| 2006/0076385 A1* | 4/2006 | Etter | B23D 59/008 |
| | | | 227/2 |
| 2016/0054721 A1* | 2/2016 | Öberg | G05B 19/182 |
| | | | 700/168 |
| 2016/0354912 A1* | 12/2016 | Bartoszek | B25F 5/001 |
| 2017/0060356 A1 | 3/2017 | Oota et al. | |
| 2018/0126509 A1* | 5/2018 | Pereira | B23Q 5/32 |

FOREIGN PATENT DOCUMENTS

| | | | |
|---|---|---|---|
| EP | 2 927 186 A1 | | 10/2015 |
| JP | 009233765 A | * | 10/2009 |

* cited by examiner

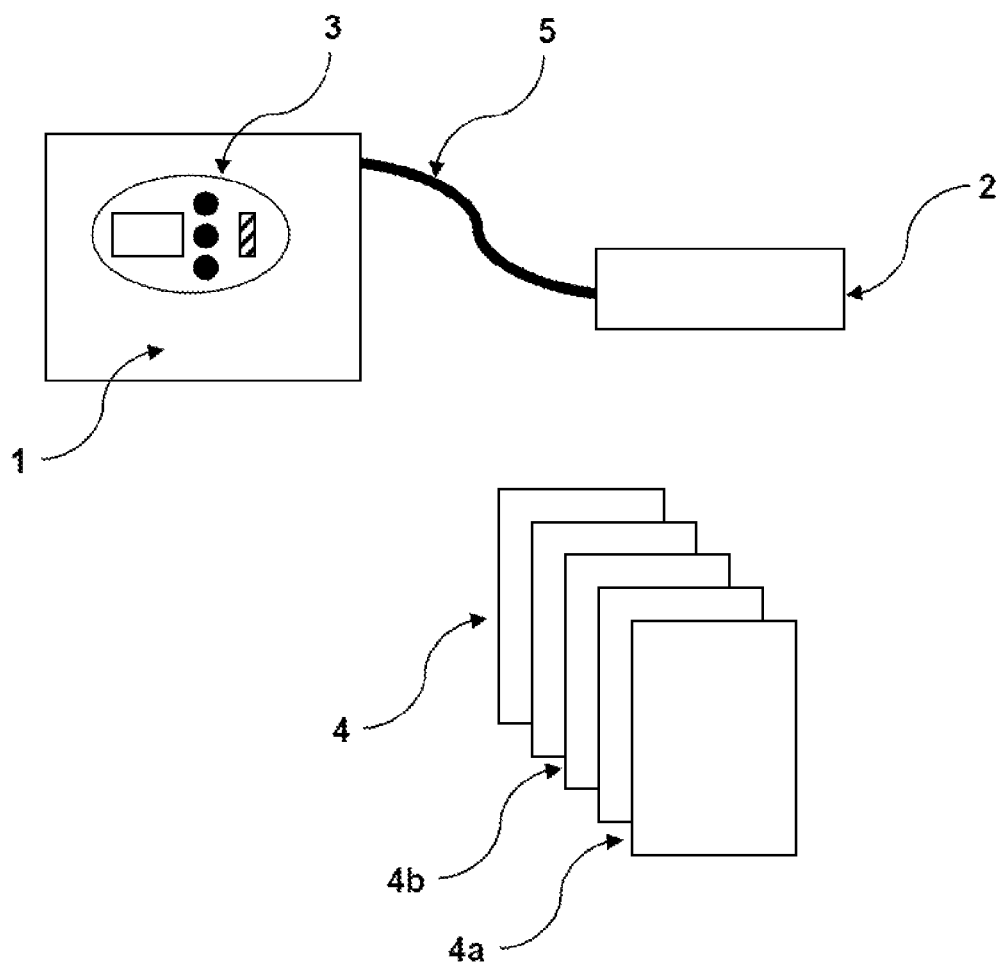

SYSTEM AND METHOD FOR CONTROLLING A CORE DRILL AND AN AUTO FEED DEVICE WITH A HUMAN MACHINE INTERFACE ARRANGED ON THE CORE DRILL

BACKGROUND AND SUMMARY OF THE INVENTION

The present invention relates to a system which comprises a core drill and an automatic feed device, the core drill having a human machine interface (HMI) for controlling the core drill and the automatic feed device. The system is characterized, among other things, in that menu navigation of the HMI can be controlled automatically in dependence on operating states of the core drill and/or the automatic feed device. In a further aspect, the invention relates to the use of an HMI for controlling a core drill and/or an auto feed device, the core drill and the auto feed device together forming a work system.

In the field of power tools, in particular in the case of core drills, which can be equipped for example with diamond-tipped drill bits, it is known to operate the power tools in connection with an automatic feed device (auto feed). Such devices, which are also known as auto feed devices, are preferably set up to automatically drive the power tool into the material to be machined without having to use hand-operated devices, such as rotary wheels, for this, as in the past.

In order to achieve a desired work result, the automatic feed device and the power tool must work or be controlled in a way coordinated with one another. For this purpose, inputs and/or settings have to be made on the devices, such inputs or settings mostly being entered into the devices using input means. Often, however, the input means, in particular on the automatic feed devices, are kept slim for the sake of cost or for reasons of the ease of use of the system. In the prior art, such systems comprising a power tool and an auto feed device in which the auto feed device does not comprise any display elements are known in particular. Sometimes such auto-feed devices only have an emergency stop button as a minimum solution for human-machine communication. In order to still be able to control such a minimalist, automatic feed device as required, it has been proposed in the prior art to control the auto feed device via the human machine interface (HMI) of the power tool. In other words, it is known in the prior art that the HMI of the power tool is used to control both the power tool and the auto-feed device.

An HMI in the sense of the invention may for example comprise a display, display elements, operating elements or other input and/or output means with which devices can be controlled by a person or with which information relating to the device can be displayed to the operator. In particular, the term HMI in the sense of the invention describes those means on a device that enable or support communication between man and machine.

In conventional systems comprising power tools and auto-feed devices, it is sometimes customary for the auto-feed devices to also be controlled via the HMI of the power tool. This leads to various difficulties or technical challenges. Although both the power tool and the auto feed device work in the same system, it is desirable that the operating states of both system components can be displayed as simultaneously as possible. This is obviously difficult to do with only one present display, or the display has to be kept very small and is therefore difficult for an operator to read. In addition, both the power tool and the auto feed device must be operated with the same operating elements—specifically the operating elements of the HMI of the power tool. This can easily lead to incorrect entries, which can lead to incorrect and possibly non-reversible undesired work results. It follows that both the display and the input of data can be difficult if only one HMI—usually the HMI of the power tool—is used as the control means for both the power tool and the auto-feed device.

In order to remedy this, it has been proposed in the prior art that the operator of the system selects an operating mode from the power tool and the automatic feed device, and thus the device that is currently being operated. In the sense of the invention, the term "operating mode" preferably means that, at a point in time ti, either the power tool or the automatic feed device is controlled with the HMI of the power tool. There is therefore a power tool operating mode and an auto-feed device operating mode. The operator can thus select on the HMI whether he/she wants to operate and/or control the power tool or the auto feed device. He/she can also select for this the appropriate accessories that are relevant to the device in question, such as a digital spirit level or a manual tapping stage selection. However, this is usually associated with manual intervention in the system and usually with an undesirable loss of efficiency. In addition, such a selection process requires considerable specialist knowledge of the operator, which may not always be guaranteed.

DE 10 2011 082 988 A1 discloses a control device for a power tool, the control device comprising an operating panel which can be used, for example, to display a user interface.

EP 2 927 186 A2 relates to a method and system for operating an industrial truck, in which a control device, for example depending on an operating state, displays a bar code with associated information that can be read out with an additional, external device.

A numerical control with a menu is disclosed in DE 10 2016 010 068, a machine learning model being used to determine a menu item display sequence in the menu display on the basis of the state data.

The object on which the present invention is based is to overcome the disadvantages of the prior art described above and to provide a system comprising a power tool and an automatic feed device with which both the display and the input of data into or from the system can be facilitated. In particular, the known solution to control an auto feed device via an HMI of the power tool with which the auto feed device works is to be improved in the sense that the different operating modes of the system function in a way that is as simple, self-explanatory and ergonomic as possible for the user. In particular, this is intended to provide a particularly intuitive and easy-to-learn control within the different operating modes of the system, in particular allowing the system to function in "normal" operation of the power tool and in conjunction with an auto-feed device.

According to the invention, a system which comprises a core drill and an automatic feed device is provided, the core drill having a human machine interface (HMI) for controlling the core drill and the automatic feed device. The system is characterized in that menu navigation of the HMI in dependence on operating states of the core drill and/or the automatic feed device can be controlled automatically, in that the menu navigation of the HMI comprises menu pages and the menu pages can be displayed in dependence on operating states of the core drill and/or the automatic feed device, so that the menu navigation of the HMI can be controlled automatically, depending on the operating states of the core drill and/or the auto-feed device. In the sense of the invention, this means that the individual menu pages or components of individual menu pages can be displayed in dependence on operating states of the power tool and/or the automatic feed device.

The core drill is preferably also referred to in the description of the invention as a power tool; this means in each case the proposed core drill. The auto-feed device is preferably set up to provide a cut assist function. In the sense of the invention, this means that a tool of the power tool is driven into a wall to be machined or into a substrate to be machined by means of the auto-feed device. The tool of the power tool may be for example a drill bit. Often such drill bits are tipped with diamonds or diamond chips to improve the cutting performance. In these cases, it is preferred that the power tool is a diamond core drill. The invention consists in that the menu navigation of the HMI of the core drill is controlled depending on the operating states of the core drill and/or the auto-feed device. As a result, manual selection of the sub-menu items by the operator is advantageously no longer necessary.

In the sense of the invention, the wording "operating state of the power tool" preferably describes a state of the power tool during the operation of the proposed system. This state may be characterized by various settings and conditions of the power tool. For example, the state of a power tool may be characterized in that the power tool is switched on or in that the power tool is connected to an auto-feed device. By analogy, a state of the automatic feed device may be characterized in that its emergency stop switch is enabled or in that there is no connection to the power tool. A state is preferably characterized by a set of different sub-states, the set of sub-states preferably forming the operating state of a system component or of the proposed system. In the sense of the invention, it is preferred in particular that the operating states are formed by settings and/or sub-states of the power tool and/or the automatic feed device.

In the sense of the invention, the wording that menu navigation is "automatically controllable" preferably means that different menu pages or menu overviews are displayed without manual intervention by a human operator. The automatic controllability of the menu navigation of the HMI of the power tool represents a significant advantage of the invention. The system is preferably able to recognize the respective operating state of the system components and/or the proposed system and, in the light of the determined operating state, to display those menu items or menu sub-pages which are relevant to the operator at the current operating time in order to ensure optimal operation of the system or its components. In the sense of the invention, it is preferred that the system is set up to recognize and evaluate the operating states of the power tool and/or the automatic feed device. To determine the current operating states, the system or its components may have a suitable sensor system and/or a processor for the evaluation and/or storage of the collected and/or processed data.

Furthermore, the system may have means of communication between the power tool and the automatic feed device. The system may include a communication link with which a possibility of communication between the power tool and the automatic feed device can be provided. In the sense of the invention, it is preferred that the system comprises a communication link for communication between the power tool and the automatic feed device. The communication connection of the proposed system is preferably designed wirelessly, for example as a bluetooth communication link, though other types of communication are also conceivable in the context of the present invention, for example NFC, radio or other forms of communication that are in particular suitable for short distances. The communication may for example also be wired, that is to say for example using a cable. In the sense of the invention, it is preferred that the communication link is set up to provide the data rates and/or transmission speed required for the control or communication between the power tool and the auto-feed device.

The wording "in dependence on the operating states of the power tool and/or the auto-feed device" preferably means in the sense of the invention that the system is set up to recognize the operating state in which the power tool or the auto-feed device is currently working. The operator of the system is then shown via the HMI of the power tool only those sub-items or sub-pages of the menu navigation that are currently relevant in the respective operating state of the system. A sub-page of the menu navigation may be relevant for example in that information displayed on this sub-page is necessary for the operator or for continuing to work with the system. A relevance may for example also be attributable to the fact that the display of the HMI shows a function which can be selected in connection with operating or selection elements that also belong to the HMI of the power tool, this selection being necessary for continuing to work with the system.

In the sense of the invention, it is preferred that the auto-feed device in connection with the power tool is set up to carry out, control and/or bring about a fully automatic drilling process. In particular, the fully automatic drilling process includes the processes of tapping, drilling, recognizing the completion of the borehole and/or returning to the starting position, without being limited to this. In the sense of the invention, it is preferred that the auto-feed device of the proposed system is controlled in the auto-feed device itself, the power tool preferably providing the information required for this. In the sense of the inventors, it is also preferred that the power tool of the system provides a display and setting possibility that can be used for controlling the auto-feed device. These display and setting possibilities are preferably provided by the provision of the HMI on the power tool. The HMI of the power tool of the system proposed here is in particular set up to present complex information in a particularly clear manner. For example, a matrix dot display may be used for this. With such a display, which is set up in particular to display complex information, not only alphanumeric display lines, such as for example error codes, can be advantageously displayed, but also two-dimensional objects, such as diagrams, coordinate systems or the like. The possibility of displaying complex information distinguishes the present invention in particular from so-called segment displays, which are mostly limited to the display of single-line combinations of letters and numbers, comparable to a non-programmable pocket calculator.

The invention is to be illustrated in the following by application examples. If, for example, the auto-feed device and the power tool are connected to one another, an exchange of data between the two system components is possible, an emergency stop button of the auto-feed device is enabled and an on-off switch of the power tool is switched off, display and operating elements of the HMI of the power tool for positioning the auto feed device and/or for aligning the drilling system of the power tool can be activated. This operating state of the system is referred to in the sense of the invention for example as a cut assist positioning mode. The positioning of the auto feed device relates in particular to an up and down movement of the auto feed device. The drilling system can preferably be aligned by using a digital spirit level, which may be part of the system, in particular the power tool. If the on-off switch of the power tool is actuated in this Cut Assist Positioning mode, the display and operating elements of the HMI of the power tool change to the so-called Cut Assist Setting mode. In the Cut Assist Setting mode, the display and operating elements for setting and for starting automatic drilling can be activated. The setting of automatic drilling operation may include for example switching the breakthrough detection on or off or a power reduction function of the auto feed device. In the sense of the invention, it is preferred that the display and operating elements switch or change to "normal" core drilling operation when automatic drilling operation is started.

In the sense of the invention, it is preferred that components of the HMI of the power tool are selected from a group which may include the following components: display, touch screen, operating elements, buttons, switches, output means and/or display means, without being limited to this. In particular, the system or the HMI may also include a dashboard or a dashboard function. For example, the HMI may be set up to show different functions on the display. These functions may be for example a gear indicator, error and/or warning messages, information about the status of the communication link (bluetooth on or off), without being restricted to this. In particular, the HMI of the power tool of the present invention can display several different items of information at the same time, since the display is advantageously not limited to a one-line display.

In a second aspect, the invention relates to a method for controlling a core drill and an auto-feed device with a human machine interface (HMI), which is arranged on the core drill, the method being characterized by the following steps:

provision of a core drill with an HMI, provision of an automatic feed device, a menu navigation of the HMI of the core drill being set up in such a way that, at a time Operation of the operation of the core drill or the automatic feed device, only those menu pages of the menu navigation that are required for the operation of the core drill and/or the automatic feed device and/or its continuation are displayed via the HMI. In the sense of the invention, it is particularly preferred that the automatic feed device does not comprise its own HMI, but that the auto feed device is also controlled by the HMI of the core drill. It is provided in the context of the present invention that the menu pages of the menu navigation are selected in dependence on operating states of the power tool and/or the automatic feed device. In particular, the power tool and/or the automatic feed device are set up to recognize and evaluate the operating states of the power tool and/or the automatic feed device.

In a further aspect, the invention relates to the use of a human machine interface (HMI) for controlling a core drill and an auto-feed device. The use is characterized in that the HMI is arranged on the core drill and comprises a menu navigation, the menu navigation of the HMI being automatically controllable in dependence on operating states of the core drill and/or the automatic feed device by the menu navigation of the HMI comprising menu pages and the menu pages being displayable in dependence on operating states of the core drill and/or the automatic feed device, so that the menu navigation of the HMI can be controlled automatically, depending on the operating states of the core drill and/or the auto feed device. The definitions, technical effects and surprising advantages that have been described for the proposed system apply analogously to the method and the use of the HMI of the core drill.

Further advantages can be found in the following description of the FIGURE. The FIGURE, the description and the claims contain numerous features in combination. A person skilled in the art will expediently also consider the features individually and combine them to form useful further combinations.

BRIEF DESCRIPTION OF THE DRAWING

The FIGURE shows a view of a preferred design of the invention.

DETAILED DESCRIPTION OF THE DRAWING

In the FIGURE, identical and similar components are denoted by the same reference signs.

The FIGURE shows a view of a preferred design of the invention. In particular, the FIGURE shows a system which comprises a power tool (1) and an automatic feed device (2). According to the invention, the power tool (1) is a core drill. The power tool (1) has a human machine interface (HMI) (3), while the auto-feed device (2) does not have its own HMI (3) in the sense of the invention. However, the automatic feed device (2) may have an emergency stop switch, which is not an HMI in the sense of the invention. The HMI (3) of the power tool (1) may comprise a display, operating elements, switches and/or buttons, without being restricted to this. In the sense of the invention, it is preferred that the power tool (1) and the automatic feed device (2) are connected to one another via a communication link (5), so that communication and/or data exchange between the system components (1, 2) can advantageously take place. The communication link (5) may preferably be formed wirelessly, for example as a bluetooth communication link. However, various other types of wireless communication are also preferred in the context of the present invention.

In the lower right area of the FIGURE, a schematic illustration of a menu navigation (4) is shown. The menu navigation (4) comprises several menu sub-pages (by way of example: 4a, 4b), which can be displayed to an operator of the system via the HMI (3) of the power tool (1) in dependence on operating states of the power tool (1) and/or the automatic feed device (2). The operator can then make decisions regarding the operation of the system or make settings on the power tool (1) and/or on the auto-feed device (2) in the light of the information presented for example. In the sense of the invention, it may be preferred that the operator is shown a single relevant menu sub-page (4a, 4b). However, it may equally well be preferred that the operator of the system is shown a sequence of menu sub-pages (4a, 4b) of the menu navigation (4). The display and selection of the menu sub-pages (4a, 4b) is preferably centrally controlled by the system, this display and selection in the sense of the invention preferably being preferably referred to as "automatic control" of the menu navigation (4). In particular, the operating states of the power tool (1) and the auto-feed device (2) are used for the selection of the menu sub-pages (4a, 4b) to be displayed.

LIST OF REFERENCE CHARACTERS

1 Power tool, core drill
2 Automatic feed devices
3 Human Machine Interface (HMI)
4 Menu navigation
5 Communication link

The invention claimed is:

1. A system, comprising:
a core drill (1); and
an automatic feed device (2);
wherein the core drill (1) has a human machine interface (HMI) (3) for controlling the core drill (1) and the automatic feed device (2);
wherein the system is configured to recognize an operating state of the core drill (1) and an operating state of the automatic feed device (2);
wherein a menu navigation (4) of the HMI (3) is automatically controllable in dependence on the operating state of the core drill (1) and the operating state of the automatic feed device (2);
wherein the menu navigation (4) of the HMI (3) of the core drill (1) comprises first menu pages that are relevant to the core drill (1) and second menu pages that are relevant to the automatic feed device (2) and wherein the first menu pages are displayed via the HMI (3) when the operating state of the core drill (1) is recognized and wherein the second menu pages are displayed via the HMI (3) when the operating state of the automatic feed device (2) is recognized.

2. The system as claimed in claim 1, further comprising a communication link (5) for communication between the core drill (1) and the automatic feed device (2).

3. The system as claimed in claim 2, wherein the communication link (5) is a wireless communication link.

4. The system as claimed in claim 1, wherein the operating state of the core drill (1) and the operating state of the automatic feed device (2) are formed by respective settings or sub-states.

5. A method for controlling a core drill (1) and an automatic feed device (2) with a human machine interface (HMI) (3) of the core drill (1), comprising the steps of:
setting up a menu navigation (4) of the HMI (3) of the core drill (1) such that at a time of an operation of the core drill (1) only menu pages of the menu navigation (4) that are relevant to the operation of the core drill (1) are displayed via the HMI (3) and such that at a time of an operation of the automatic feed device (2) only menu pages of the menu navigation (4) that are relevant to the operation of the automatic feed device (2) are displayed via the HMI (3).

6. A use of a human machine interface (HMI) (3) for controlling a core drill (1) and an automatic feed device (2), comprising:
disposing the HMI (3) on the core drill (1), wherein the HMI (3) comprises a menu navigation (4), wherein the menu navigation (4) of the HMI (3) is automatically controllable in dependence on an operating state of the core drill (1) and an operating state of the automatic feed device (2), wherein the menu navigation (4) of the HMI (3) comprises first menu pages that are relevant to the core drill (1) and second menu pages that are relevant to the automatic feed device (2), wherein the first menu pages are displayed via the HMI (3) when the operating state of the core drill (1) is recognized, and wherein the second menu pages are displayed via the HMI (3) when the operating state of the automatic feed device (2) is recognized.

* * * * *